June 5, 1956  T. B. FUNK  2,748,553
LAWN MOWER CONSTRUCTION
Filed April 26, 1950  3 Sheets-Sheet 1
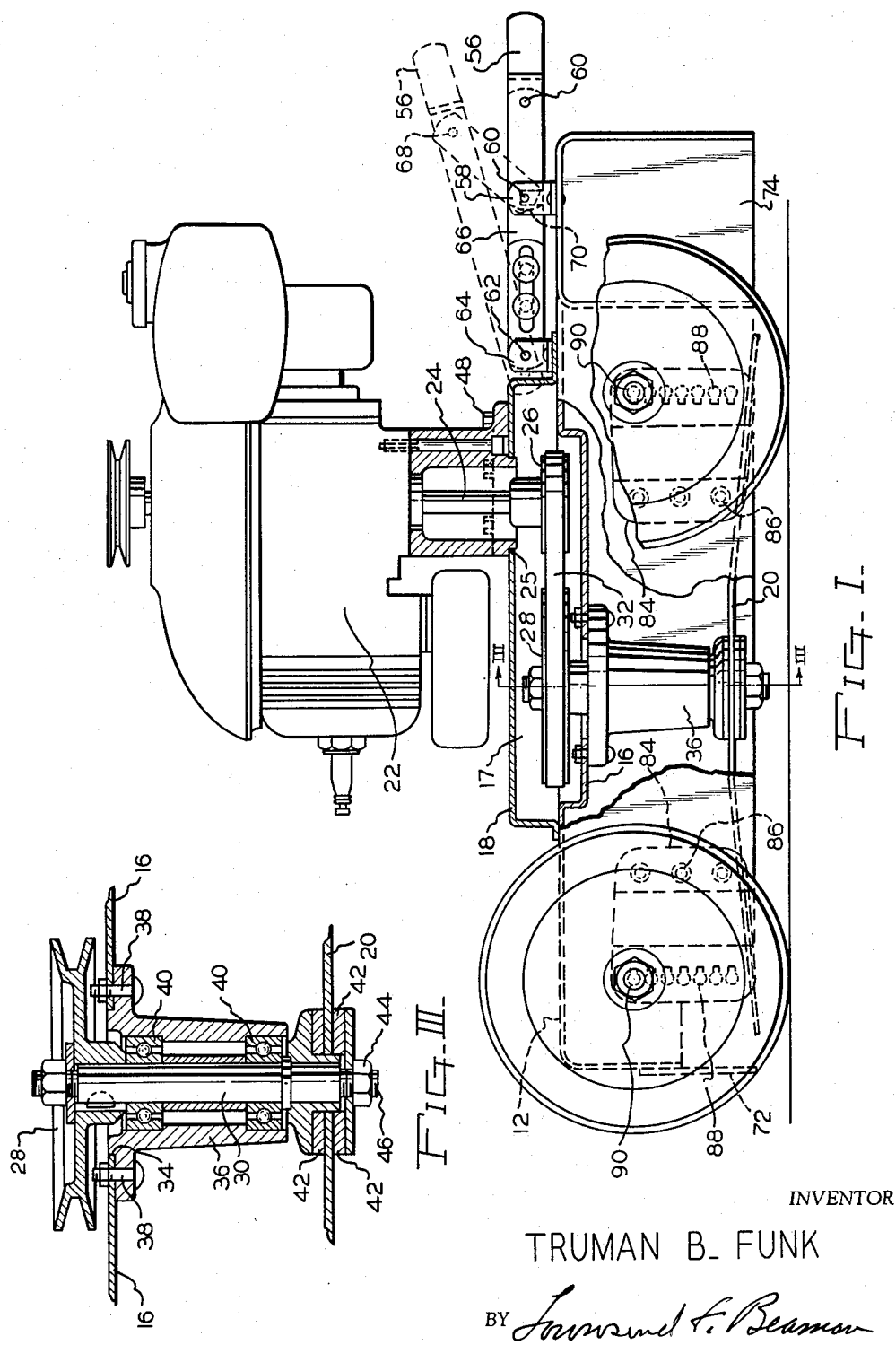
INVENTOR
TRUMAN B. FUNK
BY
ATTORNEY

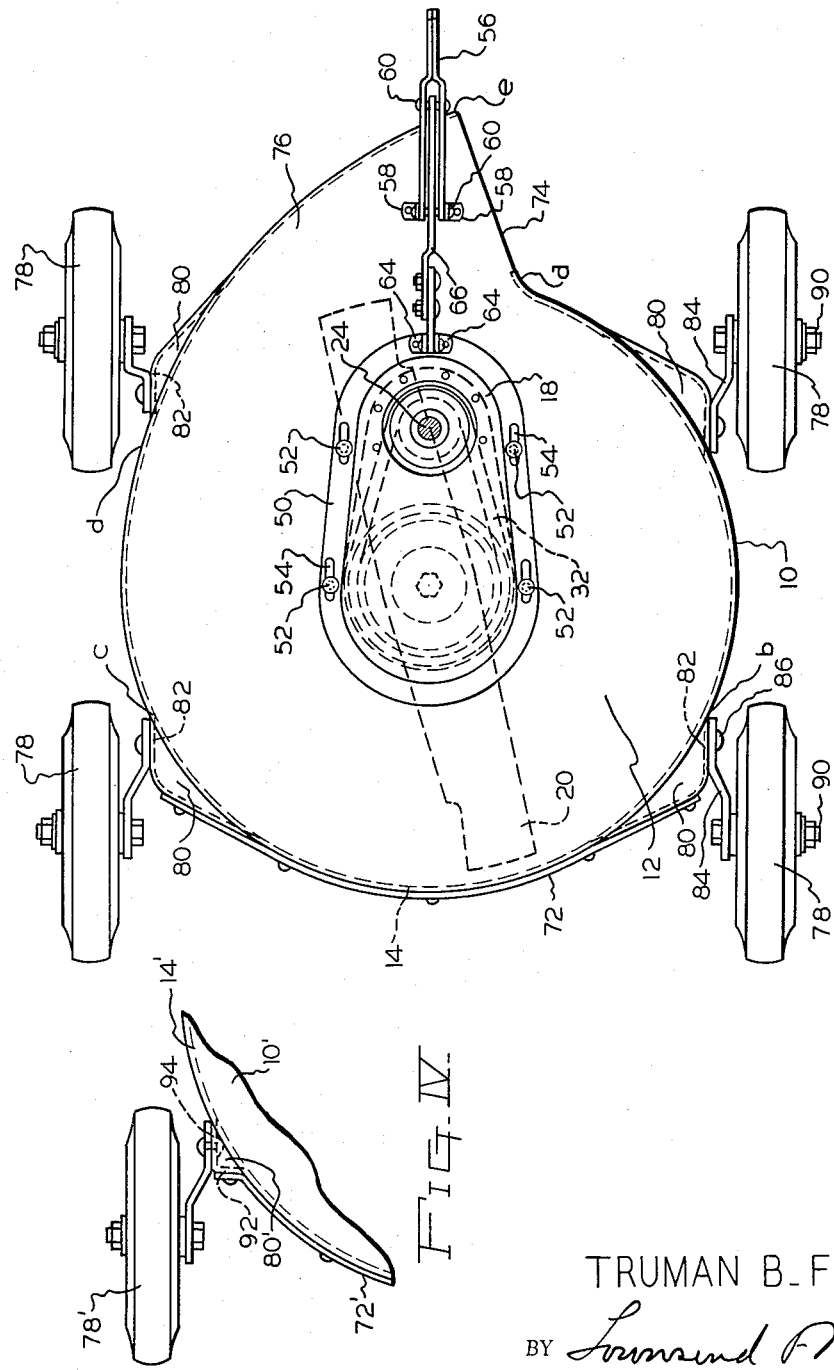

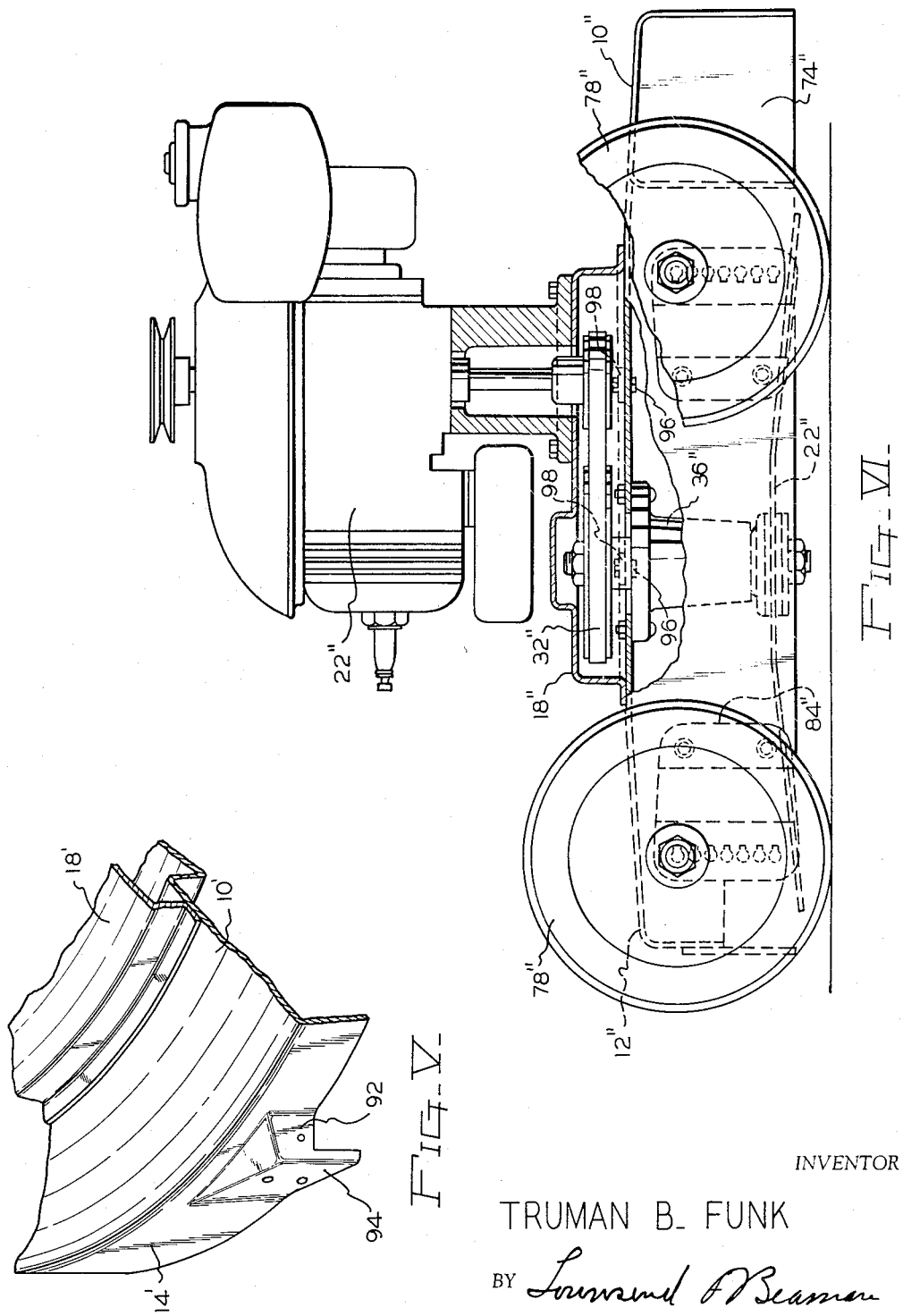

United States Patent Office 2,748,553
Patented June 5, 1956

2,748,553

LAWN MOWER CONSTRUCTION

Truman B. Funk, Jackson, Mich., assignor to Yard-Man, Inc., Jackson, Mich., a corporation of Michigan Application April 26, 1950, Serial No. 158,243

3 Claims. (Cl. 56—25.4)

The present invention relates to improvements in grass and weed cutting devices of the type in which a blade is rotated at a relatively high speed about a substantially vertical axis.

In devices of the type described, it has been the general practice to either drive the shaft carrying the cutting blade directly by a prime mover having a vertical drive shaft or to belt the vertical blade shaft to a horizontal drive shaft on the prime mover. According to the present invention, the drive shaft for the blade has been horizontally belted to the vertical drive shaft of the prime mover. This arrangement provides better distribution of weight, enables the blade shaft to be conveniently driven at less than the speed of the prime mover, and adapts itself to declutching the blade shaft from the drive shaft.

Thus, one object of the invention is to provide an improved cutting device of the type described in which the axis of rotation of the blade shaft and drive shaft of the prime mover are vertically disposed in horizontally spaced relationship.

Another object is to provide a cutting device of the character described in which a sheave housing is provided between the upper surface of the main frame shroud and the supporting base of the prime mover.

Another object is to provide an improved cutting device having a horizontally rotated blade in which the bearing structure for the blade shaft is entirely located below the main frame shroud and with the drive sheave located directly above for horizontally belting to a drive sheave upon the vertical drive shaft of the prime mover.

A further object of the invention is to provide an improved cutting device of the rotating blade type in which a sheave and belt housing has been provided between the main frame shroud and the prime mover.

A further object is to provide a practical arrangement for declutching the blade shaft from the prime mover in cutting devices of the class described.

A still further object is to provide a longitudinal and transverse stiffening embossment for mounting the wheels from the main frame shroud so constructed and arranged whereby the stresses are thrown into the crown and away from the skirt of the shroud.

These and other objects and advantages residing in the combination, construction and arrangement of parts will be more fully understood and appreciated from a consideration of the detailed specification to follow and the appended claims.

In the drawings,

Fig. I is a side elevational view of a cutting device constructed according to the present invention and partly shown in broken vertical section with the guiding handle being shown removed, Fig. II is a plan view on a reduced scale of Fig. I with the guiding handle removed, Fig. III is an enlarged vertical cross-sectional view through the blade shaft and its bearing structure taken on line III—III of Fig. I, Fig. IV is a fragmentary detail of a modified form of attachment structure for the wheels, Fig. V is a fragmentary perspective view of the detail of Fig. IV with the wheel and guard structure shown removed, and Fig. VI is a view similar to Fig. I of a modified form of the invention.

In the several forms of the invention illustrated each is of the same general main frame construction with the substantial differences residing in the central portion of the main frame shroud where the prime mover is mounted.

In the form shown in Figs. I to III, inclusive, the main frame 10 is in the form of a sheet metal shroud having a dome portion 12 and a skirt portion 14. The central portion 16 of the dome 12 is shown recessed to stiffen the dome 12 and provide a housing 17, in conjunction with the support base 18, for the drive mechanism which rotates the cutting blade 20.

The base 18 provides a mounting structure for the prime mover 22 which is shown as an internal combustion engine having a vertical drive shaft 24 extending through the opening 25 and carrying a grooved pulley 26 at its lower end located in the housing 17. A pulley 28 on the blade shaft 30 is driven by the belt 32.

Piloted in the opening 34 is a flanged cast bearing structure 36 bolted at 38 to the under side of the portion 16. Ball bearings 40 give support to the shaft 30. The blade 20 is clamped between suitable washers 42 by tightening the nut 44 on the threaded end 46 of the shaft 30. As more clearly shown in Fig. III, the pulley 28 is conventionally attached to the upper end of the shaft 30.

As more clearly shown in Figs. I and II, the prime mover 22 is bolted at 48 to the base 18 which has a flanged peripheral edge 50 resting flush upon the upper surface of the dome 12 outside of the recess 16. Shoulder rivets or bolts 52 extend through the slots 54 in the flanged edge 50 to secure the base 18 to the dome 12 yet provide limited movement of the base 18 on the upper surface of the dome 12 longitudinally of the slots 54. This limited movement is employed to tighten and slacken the belt 32 to selectively drive the cutting blade 20 from the prime mover 22.

Obviously, the mechanism for shifting the base 18, may take many forms. In the form illustrated, the lever 56 is pivoted on the brackets 58 at 60. Pivoted at 62 on a bracket 64 is an adjustable length link 66 which is pivotally connected to the lever 56 at 68. A slot 70 in the link 66 engages over the pin 60 to latch the base 18 in a belt-tightening position. When the lever 56 is raised, as shown in dotted line in Fig. I, the base 18 is shifted to the left and the belt 32 is loosened to interrupt the rotation of the blade 20. This shift may also be desired at the time the prime mover is started especially when the blade 20 is in position to be retarded by tall grass.

The skirt 14 performs several functions. In addition to providing stiffness for the dome 12, the full depth portions a—b, c—d and d—e of the skirt provide a shield against tangential discharge of grass, gravel, sticks and other objects which might otherwise be thrown by the blade 20 against the ankles of the operator. The skirt portion b—c is of reduced depth as more clearly shown in Fig. I to permit the grass to pass beneath the shroud 10 where it may be acted upon by the blade 20 as the mower is advanced. An arcuate toothed guard 72 is shown attached to this portion of the skirt 14 to protect the operator's feet from the blade 20 should the prime mover 22 be cranked from the forward position. The skirt 14 is interrupted between e—a to provide the opening 74 for the tangential discharge portion 76, through which the cut grass is thrown and blown.

To strengthen the shroud 10 and provide a rigid mounting structure for the ground wheels 78, embossments 80 are formed radially outward from the vertical wall of the skirt 14 to preferably form vertical wall portions 82 substantially parallel to the longitudinal axis of the mower to which the wheel brackets 84 are secured with rivets 86, or other suitable means. As more clearly shown in Fig. I, the brackets 84 are provided with vertically spaced holes 88 in which the axle-bolts 90 may be selectively positioned to vary the height of the blade 20 above the ground.

In Figs. IV and V is shown a slightly modified form of embossment 80' in which the vertical wall portions 92 and 94 are formed substantially at right angles to each other with the wall portion 94 being substantially parallel to the longitudinal axis of the mower in a manner corresponding to that of the wall portion 82. Prime reference characters in Fig. IV refer to corresponding parts of the form shown in Figs. I to III having corresponding unprimed reference characters.

Referring to Fig. VI, a slightly modified form is shown in which the depth of the shroud 10" has been reduced over that shown in Fig. I. This has been accomplished by lowering the dome 12 into the plane of the bottom of the recessed portion 16. When this is done it necessitates increasing the depth of the base 18", as compared with the base 18, in order to provide clearance for the drive mechanism. As shown, the base 18" is bolted at 96 to the dome 12 through elongated slots 98 to permit tightening of the belt 32 in use. The primed reference characters of Fig. VI refer to corresponding parts of the form of Fig. I having corresponding unprimed reference characters.

Having thus described my invention what I claim as new and desire to cover by Letters Patent is:

1. In a rotary lawn mower of the type in which the cutting blade is rotated about an axis normal to the ground, a main frame structure in the form of a sheet material shroud for housing the blade and protecting the operator, said shroud having a peripheral depending flange, said flange being interrupted to provide a discharge opening for the cut material of said shroud, ground wheel supporting structure attached to said flange, a central portion of said shroud inwardly of said flange being disposed parallel to the ground with the mower in its operating position, a cutting blade shaft journaled in said central portion and having a blade on one end thereof disposed within said shroud, a pulley on the opposite end of said shaft and located at the opposite side of said central portion from said cutting blade, an inverted dish-shaped housing disposed over said pulley and disposed upon said central portion of said shroud in sliding engagement with the side of said central portion upon which said pulley is located, a motor carried upon said housing and having a driving pulley located within said housing, a belt extending between said first and second pulleys to drive said blade from said motor, means connected to said shroud and engaging with said housing for holding said housing in positions of sliding adjustment upon said central portion to vary the tensioning of said belt between said pulleys.

2. In a rotary lawn mower the combination as defined in claim 1 wherein said central portion of said shroud is recessed and said pulleys and belt are substantially disposed in the plane of said central portion.

3. In a rotary lawn mower the combination of claim 1 wherein said means engaging the housing is shiftable from one position to another to tighten and loosen said belt.

References Cited in the file of this patent

UNITED STATES PATENTS

| | | |
|---|---|---|
| 1,488,617 | Robinson | Apr. 1, 1924 |
| 1,661,592 | Wright | Mar. 6, 1928 |
| 2,070,621 | Rathbun | Feb. 16, 1937 |
| 2,098,265 | Van Ranst | Nov. 9, 1937 |
| 2,154,564 | Eisenlohr | Apr. 18, 1939 |
| 2,200,368 | Iverson | May 14, 1940 |
| 2,245,821 | Poynter | June 17, 1941 |
| 2,253,452 | Urschel | Aug. 19, 1941 |
| 2,540,350 | Root | Feb. 6, 1951 |
| 2,577,938 | Walle | Dec. 11, 1951 |